United States Patent

[11] 3,576,494

[72] Inventors Walter Endres Bahls
Caldwell, N.J.;
Robert E. Benway, Marion, Ind.; Alfred C. Grover, Jr., Greenbrook, N.J.; David M. Priestley, Medfield, Mass.; John Regnault, Jr.; Leo M. Whitcomb, Marion, Ind.
[21] Appl. No. 653,083
[22] Filed July 23, 1967
[45] Patented Apr. 27, 1971
[73] Assignee RCA Corporation

[54] DIGITAL COMPUTER CONTROLLED TEST SYSTEM
9 Claims, 13 Drawing Figs.
[52] U.S. Cl. .................................................... 324/73, 324/23
[51] Int. Cl. ..................................................... G01r 15/12, G01r 31/22
[50] Field of Search............................................ 324/73, 73 (AT), 158, 24, 23, 20, 115

[56] References Cited
UNITED STATES PATENTS
3,237,102  2/1966  Newell .......................... 324/115

| | | | |
|---|---|---|---|
| 3,315,160 | 4/1967 | Goodman...................... | 324/73 |
| 3,460,027 | 8/1969 | Noble............................ | 324/158X |
| 2,903,643 | 9/1959 | Dobrovolny................... | 324/24X |
| 2,996,659 | 8/1961 | Haville.......................... | 324/24 |
| 3,004,213 | 10/1961 | Reid.............................. | 324/23 |
| 3,039,604 | 6/1962 | Bickel........................... | 324/158X |
| 3,235,797 | 2/1966 | Boscia........................... | 324/158X |
| 3,237,100 | 2/1966 | Chalfin.......................... | 324/73 |
| 3,238,455 | 3/1966 | Jankowski..................... | 324/158 |
| 3,369,201 | 2/1968 | Fiore............................. | 324/20 |
| 3,144,938 | 8/1964 | Wahl.............................. | 324/158X |

Primary Examiner—Gerard R. Strecker
Attorney—John V. Regan

ABSTRACT: Relates generally to the problem of testing mass produced articles. The problem and its solution are discussed in terms of a highly sophisticated, relatively complex article, a color kinescope, many different parameters of which must be measured to ascertain whether the kinescope is suitable for incorporation in a color television receiver. The testing system described includes a digital computer of the stored program-type which automatically controls all phases of the test procedure.

FIG_2.

Patented April 27, 1971

BY [signature]
ATTORNEY

Patented April 27, 1971
3,576,494
8 Sheets-Sheet 8
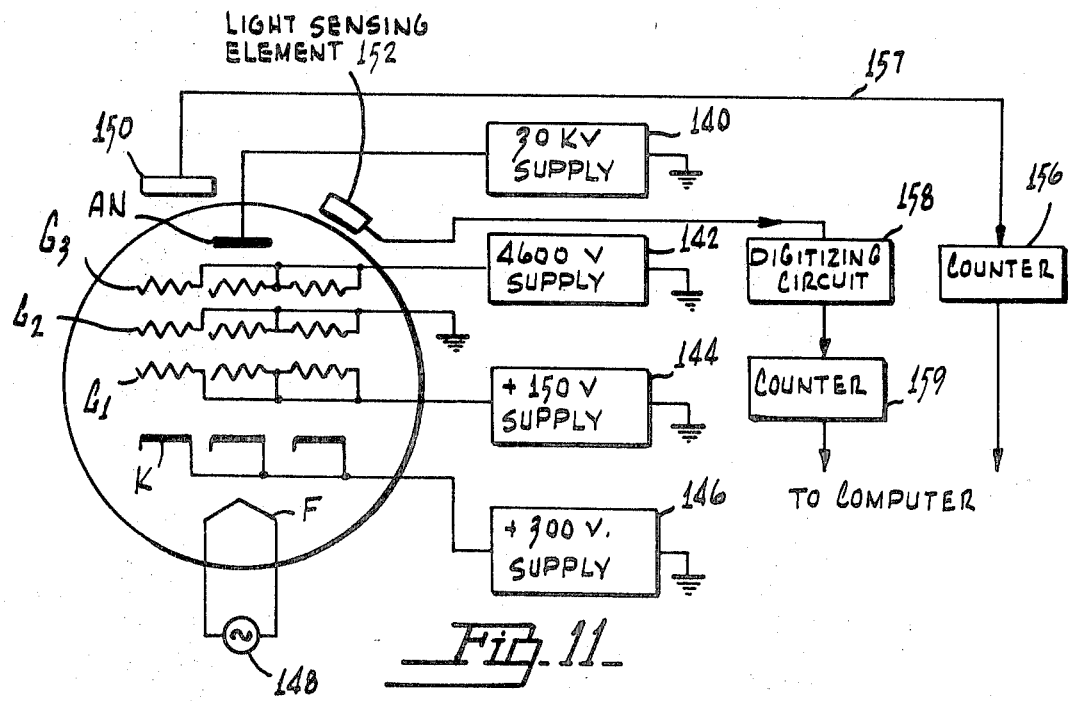
Fig. 11
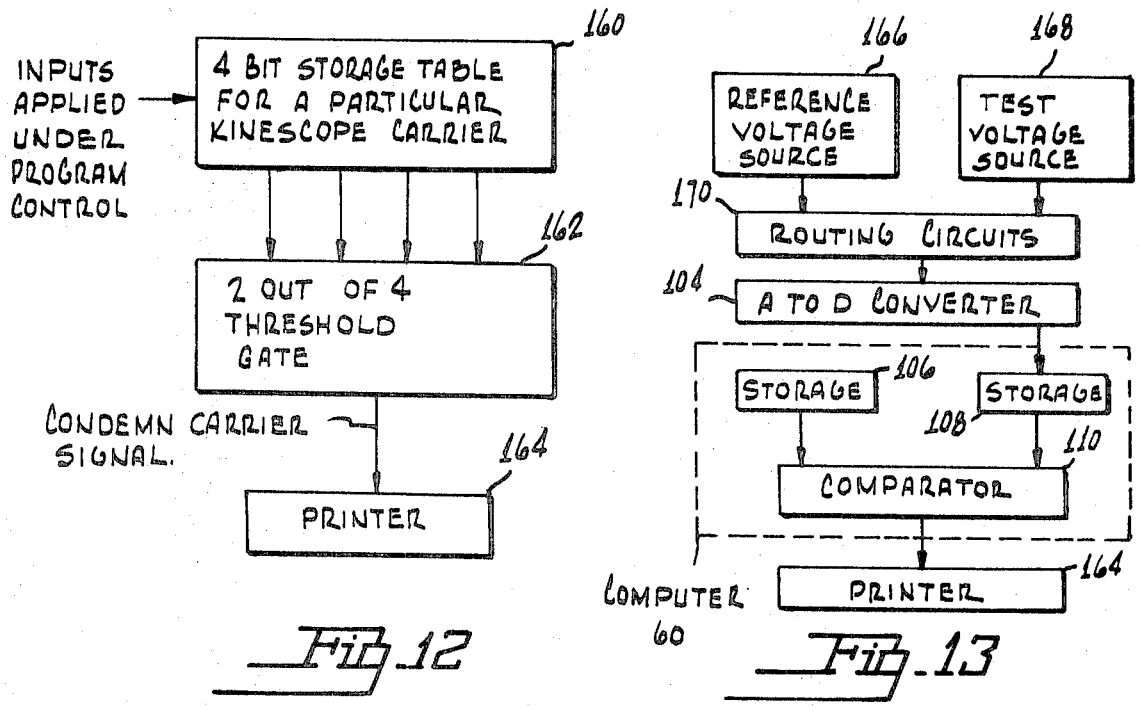
Fig. 12
Fig. 13
BY *James Cole*
ATTORNEY

3,576,494

DIGITAL COMPUTER CONTROLLED TEST SYSTEM

BACKGROUND OF THE INVENTION

An important step in the production of a complex mass produced article such as a color kinescope is the testing of the finished article. At present, the tests are performed at a number of test stations, each manned by an operator. Because of the many tests which must be made, the testing requires many people, much test equipment, a considerable amount of time, and it is relatively expensive. In addition, because of the time factor, the number of tests which can be performed is limited. Finally, due to the fact that many different human beings and many pieces of test equipment which are difficult to keep in calibration are involved in the testing procedure, it sometimes occurs that kinescopes which should be rejected are not caught and kinescopes which are perfectly good are rejected.

The object of the present invention is to provide a testing system which permits both more efficient and more accurate testing of mass produced articles than was possible heretofore and which also provides the possibility for reducing the cost of the testing procedure and improving the quality of the manufactured product.

SUMMARY OF THE INVENTION

The system of the invention includes a plurality of test stations, each testing different parameters of mass produced articles and all under the control of a digital computer of the stored program-type. The system includes means for automatically indicating whether or not an article has passed all tests and, if not, those which the article has failed and, in some cases, the steps which should be taken to repair the article. The computer, in addition, performs both immediate (real time) and later calculations and statistical analyses of the parameters being measured both as part of the testing procedure itself and also to determine deficiencies or potential weaknesses in the manufacturing process so that corrective action may be taken.

Features of the invention include the ability to handle articles of different types which require different testing procedures; the ability in the cases in which the applied stimuli employed to produce outputs from the article indicative of parameters whose value it is desired to measure are of inappropriate value, quickly readjust the amplitudes of these stimuli; the ability quickly to change the scale of the equipment employed to measure the parameters of the manufactured articles; the ability to test the responses of the manufactured article to abnormal operating conditions, and a number of others to be discussed in detail below.

BRIEF DESCRIPTION OF THE DRAWING

FIG. 11 is a block and schematic circuit diagram of another test circuit in the system of the invention;

FIG. 12 is a block diagram showing another feature of the system of the invention; and FIG. 13 is a block diagram showing a self-checking feature of the system.

DETAILED DESCRIPTION

Figure 1:
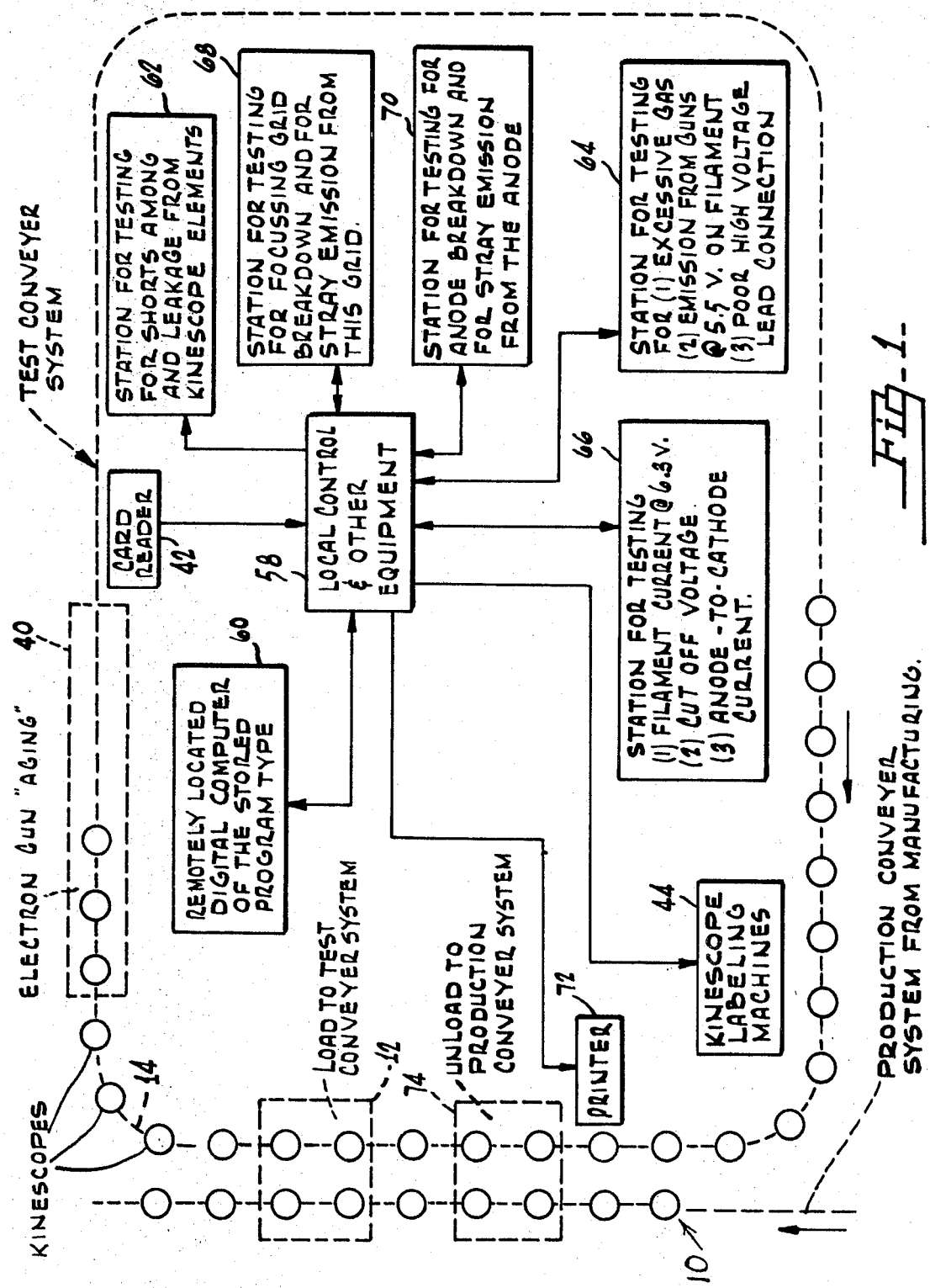
FIG. 1 is a block diagram illustrating certain features of the system of the present invention.

The manufacture of color kinescopes involves many different steps including the manufacture of the mask, the production of the screen on the faceplate, the production of the gun assembly, the joining of the faceplate to the remainder of the glass envelope, the sealing of the gun assembly to the glass envelope, the evacuation of the tube and so on. After the steps mentioned above and many others, kinescopes of different types and possibly of different classes, are taken from different feeder conveyor lines and placed on a central production conveyor system shown schematically at 10 in FIG. 1.

A class of tubes consists of tubes with only minor variations in electrical, chemical and optical characteristics. The testing procedures for the different types of tubes within a class usually differ from one another in relatively minor respects. The different classes of tubes may differ from one another in more significant physical, electrical and other respects and the testing procedures for the different classes of tubes may differ substantially from one another. The test system of the present invention has the capacity concurrently to handle tubes both of different classes and of different types within each class.

During the manufacturing process, each tube is identified by a number and, in accordance with one feature of the present invention, certain of the critical steps in the manufacturing process are recorded on a punched data processing card for that tube. For example, in the manufacturing process there are a number of different machines employed for evacuating the tubes. The identifying number of the particular machine and the evacuating cart for the particular tube is recorded on the data processing card for that tube. Also recorded are the tube class, the tube-type, the machine employed to seal the faceplate to the remainder of the glass envelope and so on. This information is recorded in conventional fashion by punching holes in the card at stations located next to the respective manufacturing areas.

When a kinescope on the production conveyor system reaches the area 12, a factory worker lifts the tube from the production conveyor system and places it onto a carrier of the test conveyor system 14. A typical carrier is shown at 16 in FIG. 2. It includes a frame made of metal tubing and formed with a pair of yokes 18 and 20 which support the tube, face up. The frame yokes are covered with a nonconductive resilient material such as Teflon to prevent damage to the tube and as high-voltage insulation since the metal frame carries up to 62 kilovolts (kv.) of high-voltage to the tube. The data processing card 22, it may be observed, is loosely held in place to the face by a piece of masking tape 24.

There are two cables 26 and 28 extending from a metal conduit 29, all carried with the carrier 16. Both cables carry sockets and either one, 45 or 46, may be plugged onto the kinescope terminals (socket 45 is shown so connected in FIG. 2). There is also a high-voltage lead 31, shown connected to the anode terminal 33.

Cable 26 is known as the aging cable. Its purpose is to apply an alternating voltage somewhat greater than that employed in normal operation to the filament of the tube and a direct voltage to the second grids (shown in later FIGS.) of the tube, while grounding the remaining elements. For example, a voltage of 8.5 volts at 60 cycles per second may be applied to the filament and a direct voltage of 300 volts applied to the second grids of each electron gun for approximately 45 minutes. The purpose of doing this is to age the tube—to activate the cathode coating of the gun and stabilize the emission.

The aging voltages an some test voltages may be obtained from the V-groove overhead conductors 32, which are engaged by brushes 35 on the underside of the brush contact assembly 37. Element 29a is a transformer which serves the usual purpose of converting a picked up alternating voltage to the desired value.

High-voltage lead 31 supplies direct voltages up to 65 kv. to the anode terminal of the tube. The purpose of applying 65 kv. is to eliminate any nonuniformities which may be present in the gun structure such as sharp edges, dirt or the like which could adversely affect the operation of the tube. This is done prior to testing the tube. During the testing, lower high voltages such as 35 kv. are applied to the tube, as discussed later.

It may be in order here to mention that there are other steps in the manufacturing process which may be carried out either a on conveyors 10 or 14. However, as these are not essential for an understanding of the present invention, they need not be discussed here. The same holds for the remainder of the discussion in this patent application. Throughout, steps which are well understood in the testing and manufacturing process and/or which are not required for an understanding of the present invention are not discussed.

The electron gun aging process discussed above may be carried out along the conveyor 10 or along the conveyor 14, however, for purposes of this application, it is shown to occur along the conveyor 14 in the region within dashed block 40 of FIG. 1. It takes the kinescope some 45 minutes to travel through this region and, as already mentioned, during this time a relatively high-voltage is applied to the kinescope filament.

Figure 2:
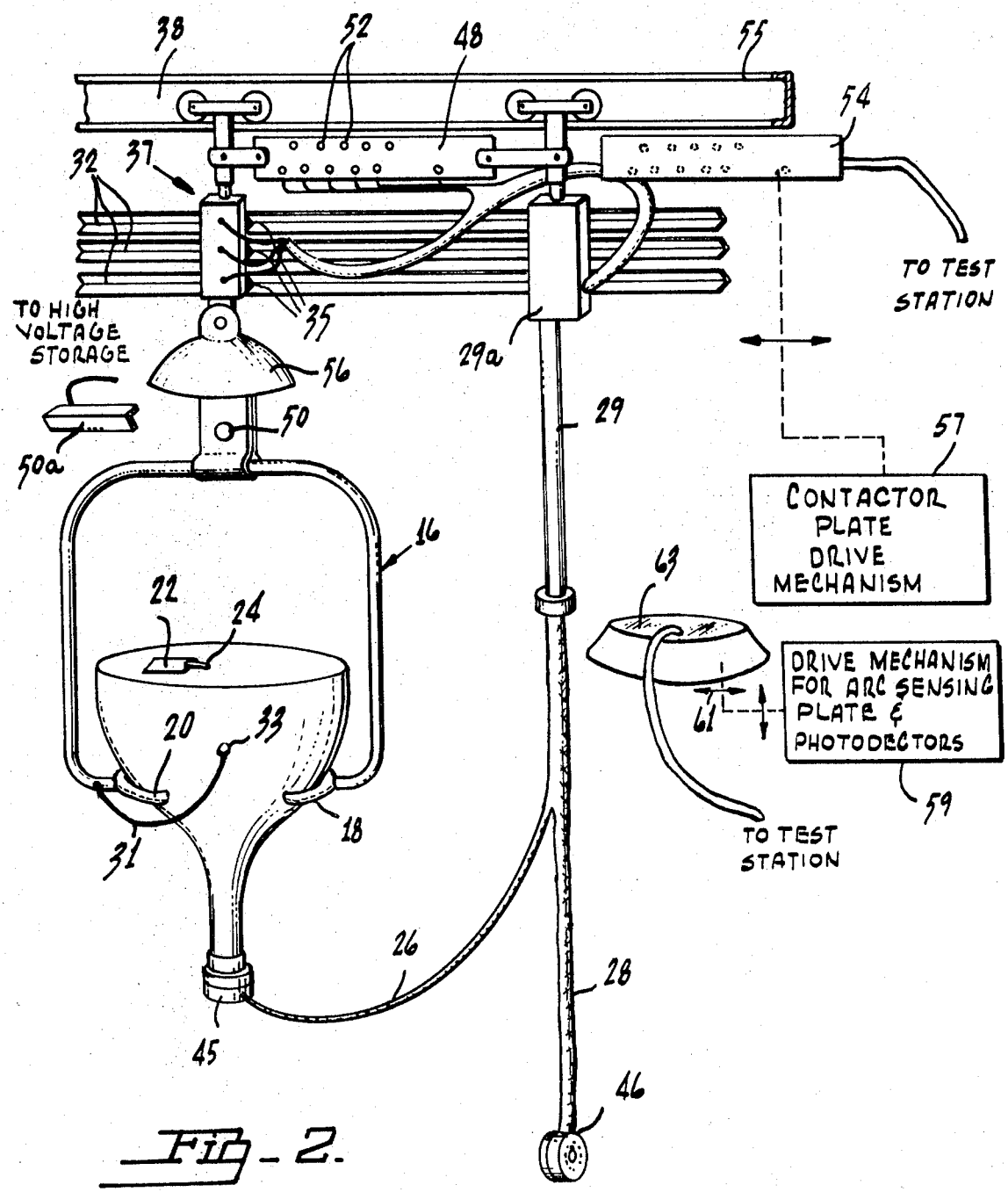
FIG. 2 is a schematic showing of the way in which a color kinescope is conveyed when it is being tested.

When a kinescope leaves the aging area, an operator removes the aging socket 45 of FIG. 2 and connects the test socket 46. In addition, an operator removes the card 22 from the face of the kinescope and places it in the card reader 42 of FIG. 1. (As previously mentioned, this card includes such vital information as the tube class, the tube-type, and the identification of the equipment which took part in the manufacture of the kinescope.)

Each carrier 16 (FIG. 2) is assigned a number giving its relative position on the conveyor. The numbers are in ascending order beginning with 000. When the system is started, the number of the carrier about to enter the area known as the Age Data Entry area (the card reader is located here) is entered into the computer by the computer operator. From that time on, the computer program (the software) keeps track of the position of each carrier on the conveyor. To insure that proper track is maintained, each carrier whose number ends in 00 (e.g. 100, 500, etc.) may be provided with a special arm (not shown) which actuates a microswitch (not shown) located near the card reader which signals this information to the computer.

After the card is placed in the card reader, and the card reader is closed, the operator depresses one of four buttons on the card reader control panel to indicate the test status of the tube. If the tube is coming by for the first time, the 0 button is depressed. If the tube has been aged a second time, this is an indication that the tube previously has been tested and has failed one or more tests, as will be discussed in greater detail shortly. Tubes may have been tested previously once or twice and this is signalled to the computer by depressing either the 1 or 2 key on the card reader. This information is important because it has been found through experience, that if a tube does not pass after three tests, there is little likelihood that further reaging will do much good. The computer is programmed to indicate such tubes so that they may be cracked off—the neck of the tube may be removed and a new neck and new gun added, if they fail the test.

Some tubes do not require aging because of earlier special processing (earlier manual correction of certain defects indicated in a previous run). Such tubes are loaded on the conveyor with the test socket rather than the aging socket. When such tubes reach the area of the card reader, the fourth button, labeled T, is depressed by the operator to signal this information to the computer. The T indicates to the computer that the tube has not been reaged and if it fails, it can be sent through another aging cycle.

As noted earlier, the test socket 46 of FIG. 2 is connected to the kinescope prior to or during the time the carrier reaches the Age Data Entry area. This socket connects the terminals of the kinescope to the various terminals on the contactor block 48. The latter is fixed to and travels with the conveyor 38 along side of its carrier 16 as the carrier and kinescope move. Some of the wires in the cable 28 lead to the brushes 35 on assembly 37 and connect to the filaments in the kinescope. These wires, during certain parts of the time the kinescope is on the test conveyor system, apply specific alternating voltages (e.g. 5.5 volts, 6.3 volts or 6.9 volts) to these filaments to keep the kinescope hot. During other portions of the time the kinescope is on the test conveyor system, direct voltages of appropriate values, obtained from a test station via contactor block 48, are applied to the filament instead.

The terminals 52 on the contactor block are relatively large, spring-loaded elements which are adapted to be engaged by a set of corresponding terminals on a contactor plate 54.

The carrier 16 is supported by a large insulator 56. The purpose of this insulator is to prevent high-voltage leakage from the carrier 16 to the frame 55 of the conveyor above it which is at ground potential. During certain portions of the tests very high voltages—as high as 35 kilovolts, are present, and these could couple from the carrier to the conveyor unless this precaution is taken. Such test voltages may be picked up from a test station by brush 50 which either makes sliding contact with a conductor, such as shown in part at 50a, or which makes fixed contact with a button on an arm of a test station. As discussed below, such an arm may be moved into contact with the carrier and be made to move along with it for the period the test station is performing tests on the kinescope.

In the operation of the arrangement just described, when a carrier 16 and its kinescope reaches a test station, the contactor plate drive mechanism 57 drives the contactor plate 54 into engagement with the contactor block 48. The drive mechanism than causes the contactor plate 54 to remain engaged with the contactor block 48 as the block and kinescope move along the conveyor system. The two elements remain engaged for a period somewhat greater than 8 seconds in one particular system and it is during a portion of this period that the test station performs many tests on the kinescope as will be discussed in more detail shortly.

At two of the test stations, namely 68 and 70 of FIG. 2) preferably formed of a resilient, opaque material such as rubber. Located within this housing is a plate for sensing for the presence of arcs and light sensing elements such as phototubes. Their function will be discussed later in connection with FIG. 11.

The drive mechanism 59 of FIG. 2 is for the purpose of positioning the housing 63 over the face of the tube. It accomplishes this by moving the housing in a horizontal plane, as indicated by arrows 61, and then moving the housing downward onto the face. As in the case of the drive mechanism 57, the drive mechanism 59 is mounted on a movable carriage, so that the housing 63 remains engaged with the kinescope face as the kinescope moves along the conveyor system. It remains in this position for somewhat longer than 8 seconds and then mechanism 59 lists the housing 63 upward and returns it to its original position ready for the next tube which comes along. The contactor plate 54 is disengaged from the contactor block 48 at the same time and also returns to its original position waiting for the next tube.

Returning to FIG. 1, the kinescope is now next to the card reader 42. The socket 46 of the test cable 28 (both shown in FIG. 2) has been plugged onto the tube terminals. The high-voltage cable 31 is in place. The information on the data processing card and the information punched into the card reader by the operator have been applied via local control equipment, illustrated by the single block 58 of FIG. 1, to a remotely located digital computer of the stored program-type illustrated by block 60. In one particular application, this computer is in an air-conditioned room more than 200 feet from the kinescope testing location. In this particular system, the computer employed is a commercially available SDS model 920 computer, however, other computers of the stored program-type may be employed instead. As one example, in a system which is substantially larger than the one described herein, an RCA Spectra 70/45 or other large computer may be employed instead.

The computer 60 records the information supplied to it by the card reader and indicates to the various test stations to be discussed next the specific tests to be performed on the color kinescope identified by that card. These tests are in the form of test files (groups of program steps) which may be stored in the main memory of the digital computer or, in some cases, in an auxiliary memory. As an example of the latter, if the main memory (a magnetic core memory, for example) in the digital computer is of insufficient capacity to store the test files which describe the tests for all of the various kinds of kinescopes to be tested during a certain run, some of the files may be stored on a drum or disc and these may be read into the main memory, when needed.

After the information on the card has been recorded by the computer, the operator removes the card from the card reader and secures it to the side of or to one edge of the face of the kinescope so that the card will not interfere with arc sensing and light emission tests. The kinescope, which is moving during all of this time, soon approaches the first test station 62. It should be mentioned, as an aside, that in actual operation it only takes a matter of seconds to enter the information on the card into the card reader and to return the card to the kinescope. During this time, the kinescope moves only several feet so that the operator easily may return the card to the proper kinescope.

When the kinescope reaches test station 62, the contactor plate 54 of the test station engages the contactor block 48 of the carrier for that kinescope and the testing procedure starts. This procedure involves the application of voltages (stimuli) to various of the electrodes of the kinescope and the sensing of the resulting currents or voltages which are produced at some of these or other electrodes of the kinescope.

Test station 62 and also test stations 64 and 66 receive their test voltages from common power supplies located within block 58. The selection of the voltages is under the control of the stored program in the computer 60. The routing circuits, consisting of various relays which determine to which elements of the kinescope the test voltages will be applied, are located at the test station 62 and they are controlled by the program stored in the computer 60. The measuring circuits for measuring the amplitude of the signals indicative of various kinescope parameters are located in the test station 62 and also in the test stations 64 and 66. As will be discussed shortly, the scales employed in making the various measurements are determined by the program stored in the computer 60.

Test station 62 tests the kinescopes for shorts and leakage among the kinescope elements. A number of specific examples of such tests are given later. The analog voltages produced by the measuring equipment within the test station, which voltages are indicative of the kinescope parameters of interest, are applied to an analog-to-digital converter of conventional type located within block 58 and the latter applies corresponding binary information to the computer 60.

As already mentioned, a kinescope under test remains connected to a test station such as 62 for a period of somewhat more than 8 seconds. However, as it takes only hundredths of a second for each test to be made, the station 62 completes all of its tests within a period of 2 to 3 seconds. This leaves 5 to 6 seconds still available for tests. During one portion of this period, the fourth test station 64 performs a group of tests on a kinescope then present at station 64. During another portion of this period, the fifth test station 66 performs a group of tests on the kinescope present at that station. Thus, the three stations 62, 64 and 66 time-share the services of the central power supplies within block 58 and also time-share the services of the computer 60.

After the station 62 has been disconnected from a kinescope, the latter continues to move along the test conveyor system until it reaches station 68. Here, as in the case of the other stations, a contactor plate 54 (FIG. 2) engages the contactor block 48 of the kinescope and, in addition, the housing 63 of FIG. 2 is moved into position over the kinescope faceplate. Station 68 performs a group of tests on the kinescope as directed by the digital computer 60. These involve the breakdown characteristics of the focusing grid of the kinescope and also stray emission from this grid. The kinescope breakdown manifests itself as arcing within the kinescope and stray emission manifests itself as light emission. The breakdown characteristics are tested by applying a voltage to the focusing grid and anode in excess of that normally employed in the operation of the kinescope, sensing whether or not any arcs form and, if arcs do form counting the number of such arcs. The stray emission is sensed by light sensing means—phototubes, located within the housing 63 of FIG. 2, which measure the amount of light emitted from the focusing grid in response to the voltage applied thereto.

The test station 68 and also the following test station 70 have their own power supplies. These stations also include counters for counting the number of arcs which form. They also each include a measuring device such as a threshold amplifier which produces an output when the current developed in the light sensing means exceeds a predetermined value. Any fault condition sensed at stations 68 and 70 is signalled to the digital computer 60 via the local equipment 58 as discussed in more detail later.

After the kinescope has been disconnected from the station 68, it continues to move along the test conveyor until it reaches station 70. There, in the manner already discussed, the contactor plate for the station connects to the contactor block for the kinescope, the housing 57 for the station engages the faceplate, and the station tests the anode of the kinescope both for breakdown and stray emission in a manner quite similar to that discussed above in connection with station 68. A specific test made by this station to illustrate the principles involved is given later in connection with FIG. 11.

After the tests performed by station 70 are completed, the kinescope continues to move and is successively connected to and tested by stations 64 and 66. Station 64 tests the kinescope for excessive gas, for emission from the respective kinescope cathodes at 5.5 volts applied to the kinescope filament and for a faulty high-voltage lead connection. The latter consists of a conductive coating on glass which extends from the high-voltage terminal embedded in the glass to the anode. Station 66 tests the kinescope for the filament current produced at 6.3 volts and applied to the filament, for the cutoff voltage, that is, for the voltage distribution on various electrodes of the kinescope when the spot just disappears from the phosphor screen, and for anode-to-cathode current. The second test mentioned is a simulated test, that is, rather than testing for the disappearance of a spot visually, certain electrical tests are made instead as will be discussed by way of example in connection with the circuit of FIG. 9.

During the time the various tests are being made, the digital computer 60 both stores information concerning the tests and performs certain calculations based on the tests and then reviews all of the information which has accumulated and makes a decision as to whether the kinescope tested is acceptable. If the kinescope is not acceptable, the digital computer decides what should be done with the kinescope. It may decide, for example, that another aging cycle is required. It may decide that the gun structure is sufficiently faulty that the neck of the tube must be cracked off, the gun removed and a new gun installed. It may decide that the kinescope must be reflashed in order to remove excessive gas. This involves reheating the getter for a predetermined interval and at a predetermined temperature. Finally, it may reach a decision that the failure can be corrected by certain manual procedures.

The decision which the computer reaches is communicated via the circuits in block 58 to the kinescope labelling machines 44. There are five such machines, each capable of pasting a differently colored label on a kinescope. If, for example, the kinescope has passed all tests, only the first labelling machine is actuated and it pastes a green label on the kinescope. If reaging is required, only the second labelling machine is actuated and it pastes a blue label on the kinescope. If it is necessary to crack off the neck of the kinescope and replace the gun structure, the fourth machine is actuated and it pastes a red label on the kinescope, and so on.

The printer 72 automatically prints out the deficiencies found in the respective tubes during the testing procedure. The printer also can be queried manually by depressing certain of its keys to ascertain the values of certain test parameters which have been measured. These are printed out at printer 72 in response to such queries. A second printer is located in the computer room and may be employed to print out more detailed information concerning kinescope failures and measuring equipment failures.

After the tube is labeled, it continues to travel on the test conveyor system until it reaches the unload area 74. There, all tubes other than those which must be reaged are unloaded from the test conveyor system and placed back on the production conveyor system. The tubes which must be reaged are loaded onto a different carrier on the test conveyor system. The purpose of employing a different carrier is to determine whether it is the kinescope which is bad or the carrier which is bad. (As will be mentioned later, if one carrier has a much poorer record of passing tubes than other carriers, the carrier itself becomes suspect. The tube failures, for example, may be found to be due to faulty cabling or a faulty socket on the carrier.)

Figure 3:
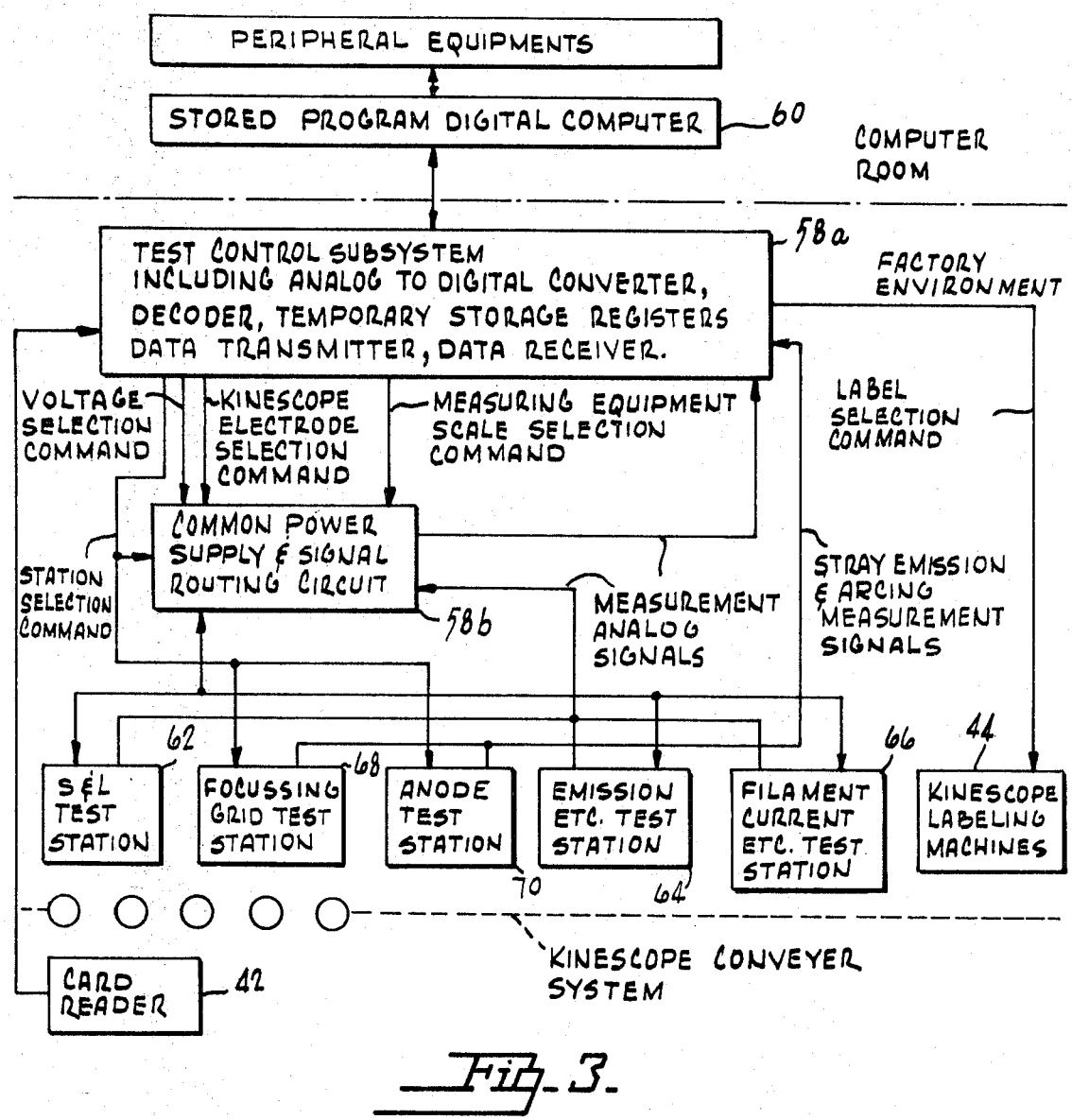
FIG. 3 is a block diagram showing other details of the system of the invention.

FIG. 3 should now be referred to. The computer itself is shown at 60 and, as already mentioned, it is located in the computer room. There are a number of peripheral equipments associated with the computer. These include a teletypewriter which prints out information concerning the tests, a drum memory, a paper tape reader, a number of magnetic tape stations and so on. All of these equipments are conventional and operate in the conventional way. The purpose of the drum is to store programs, as already mentioned. The magnetic tape is employed to store case histories and statistics concerning all of the tubes which have been tested. These histories are saved so that when tubes fail in the field they may assist in determining the cause of the failure and in improving the manufacturing process.

The remainder of the system is located in the factory environment. The local control and other equipment 58 of FIG. 1 includes the test control system 58a and the circuits of block 58b of FIG. 3. Block 58a includes an analog-to-digital converter for converting the analog signals indicative of the kinescope parameters being measured to binary form. It also includes a decoder for translating the instructions provided by the computer to a form suitable for application to, among other equipments, the power supply, the signal routing circuits, and the stations themselves. The temporary storage registers of block 58a are for temporarily storing the instructions supplied by the computer. The functions of the data transmitter and data receiver are self-evident from the respective titles.

As already mentioned, when a tube is ready to be tested, the card for the tube is read by the card reader and the latter applies this information through the test control system to the stored program digital computer. The latter sets aside a subarea in its memory in which it records this information and in which it will also record information concerning the tests. During the time the kinescopes are being tested, the digital computer provides a number of successive commands. It also performs calculations. It also has the capability of interrupting, for a short interval, any particular program which may be running to enable it to receive information of a higher priority such as test results. The interrupt circuits and techniques are well-known and need not be discussed in greater detail here.

In the operation of the system, the computer, in response to the data supplied by the card reader, will prepare a group of tests to be performed on a particular kinescope. As already mentioned, these tests are stored in the computer memory and as the computer and test system are so much faster than the rate at which the kinescope moves, there is little difficulty in performing tests in accordance with programs for a number of different tubes during a very short interval of time. Thus, the computer, for example, may perform tests on five different tube classes on five successive carriers on the conveyor system. This is just an example as the limits of the system will depend, as a practical matter, upon the speed of the conveyor system, the speed of the computer, the speed at which it is possible to change the values of the voltages employed in making the tests, the number of time-shared testing stations which are employed, and so on. In one particular installation, the system is designed to test 300 kinescopes an hour.

In operation, the computer 60 generates a station selection command. Its purpose is to select one of the three stations 62, 64 and 66 which time-share the voltages produced by the common power supplies. This command is decoded in the circuits of block 58a and applied as an energizing signal to one of the three test stations just mentioned. This permits the test stations routing circuit to operate and to apply the voltages it receives to the elements of the kinescope under test.

The digital computer also transmits a voltage selection command and kinescope electrode selection command. The voltage selection command directs the power supply to apply voltages predetermined by the program via signal routing circuits also predetermined by the program to the test station selected by the station selected command. The kinescope electrode selection command indicates the electrodes of the kinescope under test to which the various test voltages are to be applied. This command causes certain relays at the test station to close and others to open so that a particular voltage will travel to the electrode called for by the electrode selection command.

In response to the voltages applied to kinescope electrodes, the kinescope produces output voltages or currents which must be measured. These are applied to measuring equipment at the test station, such measuring equipment consisting of amplifiers and impedance networks. The range of the input signal that the amplifier is capable of measuring is relatively limited. It is therefore necessary in some cases to add impedance elements to or remove them from the amplifier circuit so that the amplifier will operate at a value greater than cutoff and less than saturation. (For example, if the amplifier initially is at saturation, a resistor may be connected across the input circuit or the degenerative feedback increased in the case of a feedback amplifier. Similar known techniques may be employed to increase the amplitude of the amplifier output signal, if required.)

The value of the scale which is to be employed in making a particular test is indicated by the measuring equipment scale selection command generated in the digital computer 60. This command, like the others, is decoded and causes certain relay contacts to close and others to open and these contacts place the required elements in their proper circuits so that the measuring equipment is operating in its proper range. As will also be mentioned shortly, it is sometimes not possible to predict exactly what the range of the measuring equipment should be. In such cases, a subroutine in the stored program is employed successively to change ranges until a proper measurement is sensed. The computer, of course, keeps track of the range scale being employed so that the actual measurement being recorded will be meaningful.

The measurement signals produced by the amplifiers at the test stations are in analog form. These are applied to the analog-to-digital converter in the test control subsystem 58a and the binary information produced by the analog-to-digital converter is applied back to the stored program digital computer 60.

As already mentioned, stations 68 and 70 contain their own power supplies and they do not produce analog signals. Instead, they produce an indication of whether or not arcs have been formed and if they have been formed, a count of the number of such arcs. They also indicate the amount of stray emission which has been detected. This information is applied through the test control subsystem to the computer 60.

Each time a test has been failed by a kinescope, a 1 is entered into a particular storage location in the subarea set aside for that kinescope. The area in which these failures are stored is known as the BFI (binary failure image) table. At the time a test has been failed, an indicator is also specified in the BAI (binary annunciator image) table. Upon completion of the tests, the computer stored program causes an analysis to be made of the information stored in the BAI table and in response thereto generates a command indicative of the color of the label to be placed on the kinescope when the latter reaches the kinescope labelling machines. For certain types of failures, the BFI table for the tube is also analyzed and the causes of failure are printed out on the remote printer to be utilized in analysis of the tube.

The computer also has subareas of its memory set aside for storing information concerning the steps in the manufacturing process. It also has subareas set aside for the tube carriers. Each time a kinescope fails, a 1 is entered into each subarea for a step in the manufacturing process which may be responsible for the tube failure. For example, if a tube fails because of excessive gas, a 1 is entered into the subarea in the memory of the computer set aside for the cart in the vacuum station on which the tube was mounted during the time it was being evacuated and baked.

Periodically, the computer analyzes the equipment failure tables and if an excessive number of 1's appear in a particular table the teletypewriter will print out a notice indicating that the corresponding step in the manufacturing process is subject. For example, the teletypewriter may state that a particular vacuum station is not evacuating the tube properly or that a particular aging/test carrier employed in the manufacture and testing of the kinescope is faulty.

Figure 8:
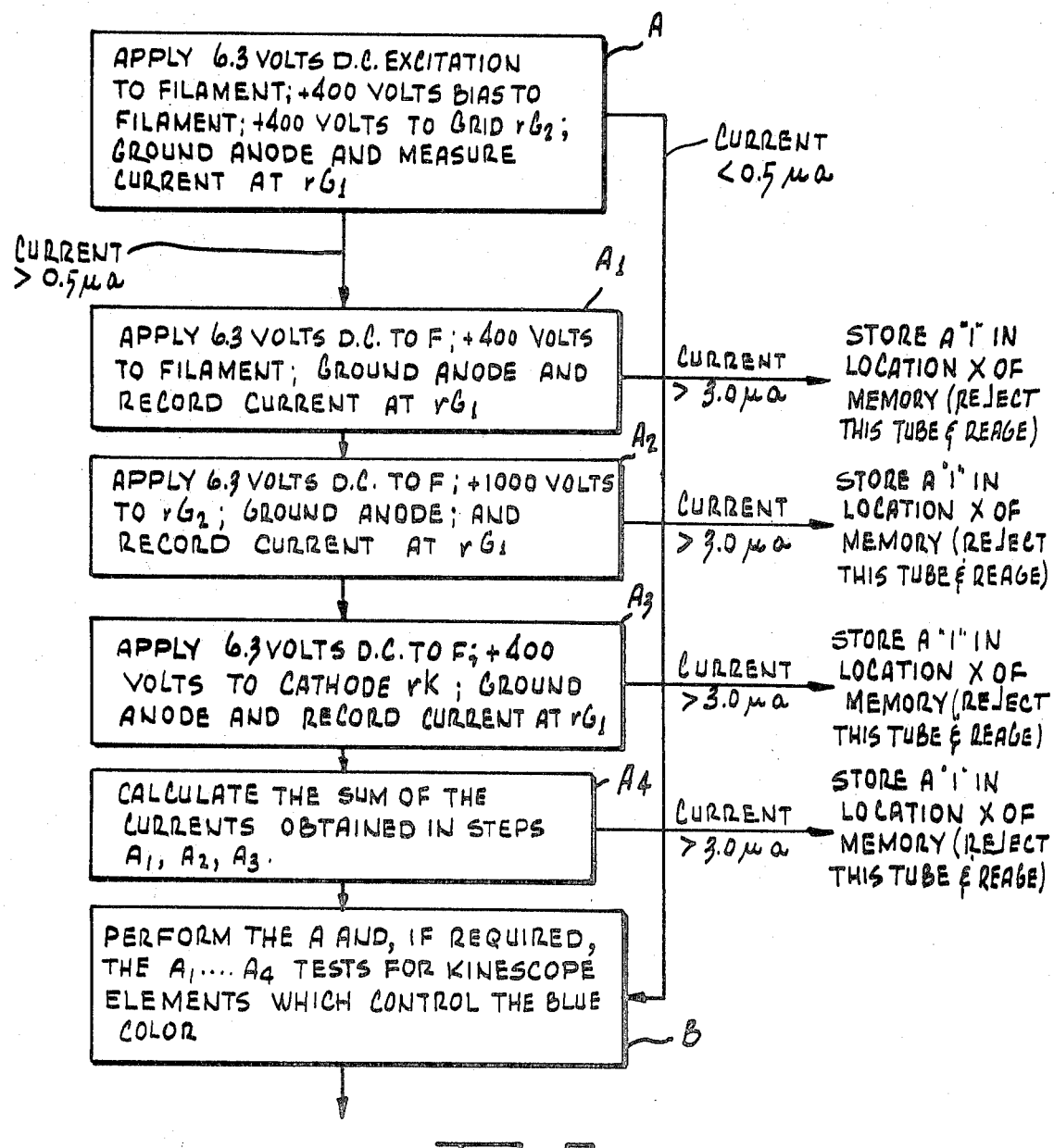
FIG. 8 is a flow chart illustrating certain steps in a testing procedure performed by the system of the invention.

The flow chart of FIG. 8 shows, by way of example, a small portion of the group of tests performed by the test station 62. In practice, this station actually performs more than 30 different tests on a tube in a period of less than 3 seconds. Moreover, during these tests the computer performs four different calculations involving the results of certain of the tests. However, the tests shown in the flow chart are representative.

Block A of FIG. 8 represents a test for leakage among a number of different elements. If the leakage current present at $rG_1$ during this test is greater than $0.5\mu a$ (microamperes) it is necessary to perform three additional tests $A_1, A_2, A_3$ and it is necessary for the computer to calculate the sum of the currents obtained in tests $A_1, A_2, A_3$. (The letters $rG_1$ refer to the control grid for the red ($r$) color. In a similar manner, $b$ refers to blue and $g$ to green.) If the leakage current is less than $0.5\mu a$, tests $A_1$ through $A_4$ automatically are skipped and test B performed next.

Figure 4:
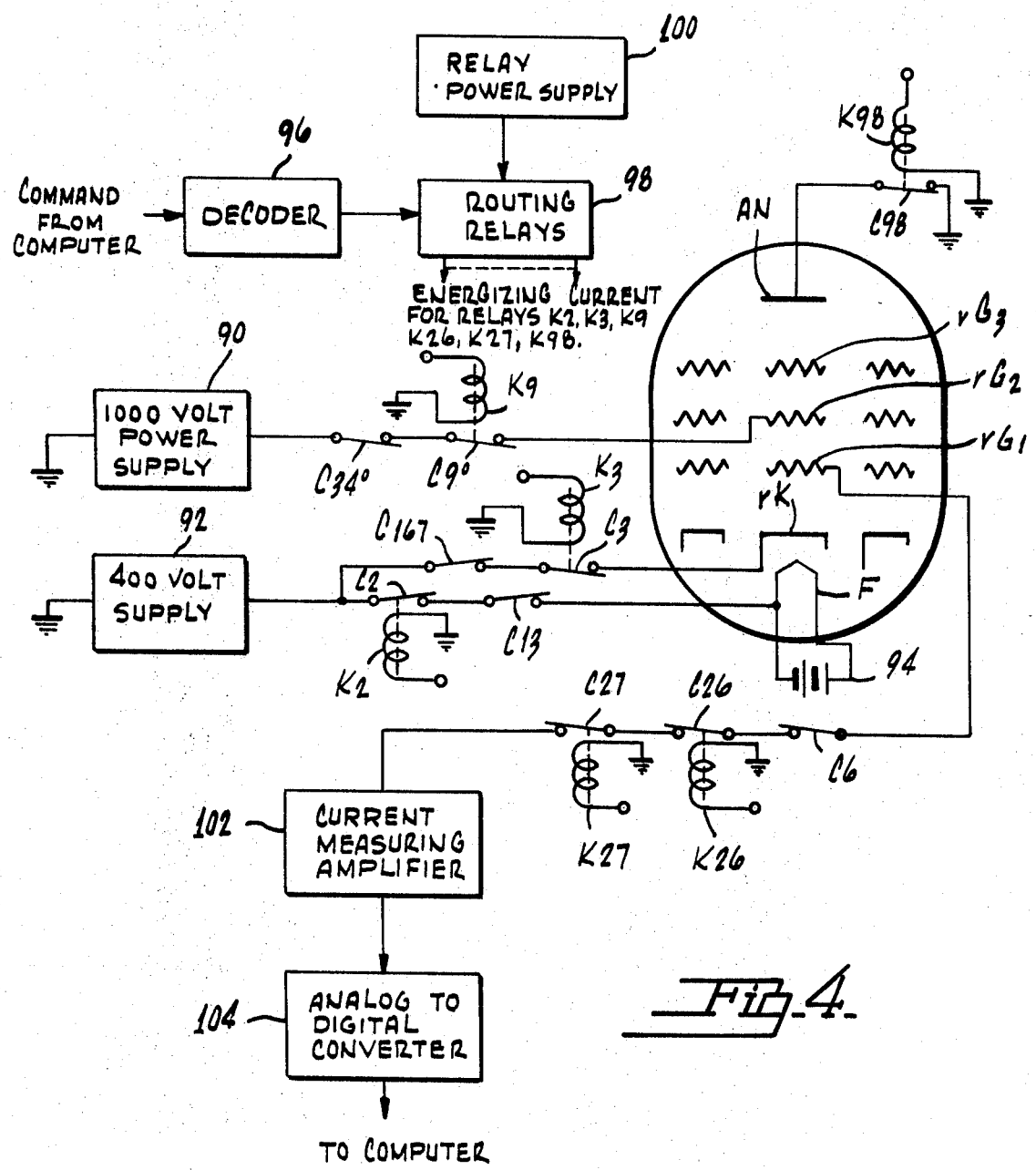
FIGS. 4—7 are block and schematic diagrams of specific tests performed in the system of the invention.

The apparatus for performing test A of FIG. 8 is shown schematically in FIG. 4. It includes a 1000 volt power supply 90 and a 400 volt power supply 92, both located in the common power supply system 58b of FIG. 3. The station selector selection command connects these power supplies through relays within the common power supply system 58b to the test station 62. Within the test station there are many different relays located in the routing circuits of the test station. Some of these relays—those pertinent to the present test, are shown in FIG. 4. For example, the normally closed relay contacts $C_{34}$ and the normally open relay contacts $C_9$ are located in series between the 1000 volt power supply and the second grid $rG_2$. The normally open relay contacts $C_2$ and normally closed relay contacts $C_{13}$ are located between the 400 volt supply 92 and the filament F. (It should be mentioned here, as an aside, that when the kinescope reaches the test station 62, the 6.9 volt AC supply is disconnected from the filament and a 6.9 volt DC supply is connected instead. The latter is illustrated schematically by the battery 94.) The normally closed contacts $C_{167}$ and the normally open contacts $C_3$ are located between the 400 volt supply and the cathode $rK$.

Upon command from the computer, the decoder 96 within the block 58a of FIG. 3 closes certain routing relays 98 within the common block 58b of FIG. 3. The relay power supply 100 now applies current through these relays to the relays $K_2$, $K_3$, $K_9$, $K_{26}$, $K_{27}$ and $K_{98}$ within the test station 62. The circuit then is completed in the manner shown in FIG. 4 so that 1000 volts is applied to grid $rG_2$, 400 volts is applied to the filament F and the cathode $rK$, and the anode AN is connected to ground. In addition, the grid $rG_1$ is connected through normally closed contact $C_6$ and the now closed contacts $C_{26}$ and $C_{27}$ to the current measuring amplifier 102 located within the test station 62.

It may be assumed for the purposes of the present discussion that the current measuring amplifier is set to the appropriate scale. The analog voltage produced by the amplifier (the current produced is translated to a voltage by means of a resistor of fixed value) is applied to the analog-to-digital converter 104 located within block 58a of FIG. 3. The binary work produced by the converter 104 indicates to the computer whether the current measured at 102 is less than or greater than $0.5\mu a$. If the current is less than $0.5\mu a$ the next test which is made may be test B of FIG. A. However, if the current is greater than $0.5\mu a$, it is necessary to perform the tests illustrated in FIGS. 5, 6 and 7. The purpose of these tests is to isolate the cause of the excessive current. Note that the kinescope is not rejected at this point. In fact, the kinescope may be perfectly good. Whether or not the kinescope will be rejected will depend upon the results of the more detailed tests discussed next.

Figure 5:
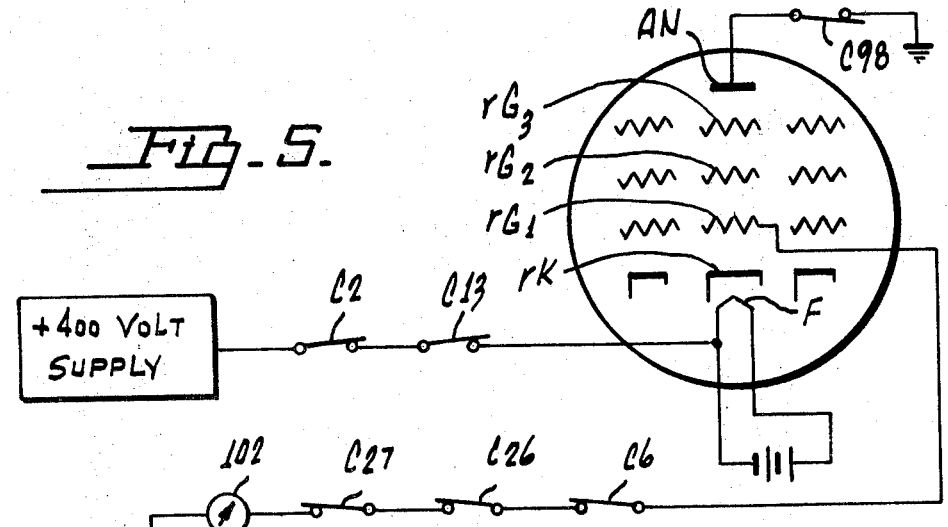
Figure 6:
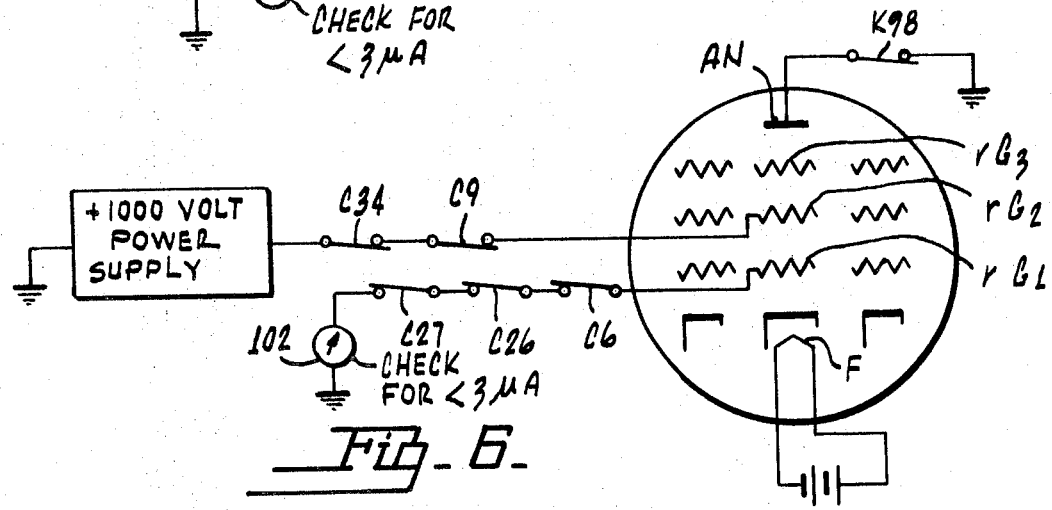
Figure 7:
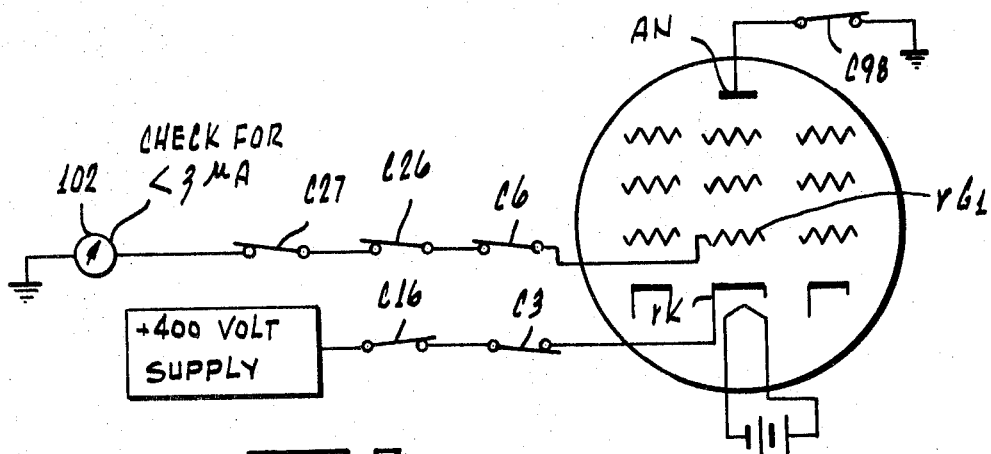

In FIGS. 5, 6 and 7, which will now be discussed, certain elements no longer essential to an understanding of the circuit operation are not shown. Thus, the decoder, routing relay coils, and so on are no longer shown. Also, the current measuring amplifier 102 is illustrated as a microammeter since the amplifier does perform the function of a microammeter.

The test illustrated in FIG. 5 is for the purpose of determining whether there is excessive leakage from the filament F to the grid $rG_1$. In the performance of this test, +400 volts is applied to the filament F and the anode AN is grounded. The remaining tube elements float. The measuring amplifier 102 indicates whether the grid current is greater or less than $3.0\mu a$. If it is greater than $3\mu a$, the kinescope is rejected, that is, a 1 is entered in the appropriate location in the binary failure indication table for that kinescope and, when the kinescope reaches the end of its test run, one of the labels indicating a rejected tube will be pasted onto the tube automatically.

The test illustrated in FIG. 6 is for the purpose of determining whether there is excessive leakage between grids $rG_1$ and $rG_2$. In this test, 1000 volts is applied to grid $rG_2$, the anode is grounded and the remaining kinescope elements float. As in the case of the test of FIG. 5, a current in excess of $3\mu a$ is sufficient cause for rejecting the tube.

The purpose of the test illustrated by FIG. 7 is to determine whether there is excessive leakage between the cathode $rK$ and the grid $rG_1$. In the performance of this test, 400 volts is applied to the cathode, the anode is grounded and the remaining kinescope elements float. Again, as in the previous two tests, a leakage current of greater than $3\mu a$ is sufficient cause to reject the kinescope.

After the tests of FIGS. 5, 6 and 7 have been completed and the binary numbers indicative of the currents produced during these tests temporarily stored, the computer sums the currents. If the sum of these three currents is greater than $3\mu a$, the kinescope is rejected. Again, as in the case of the tests $A_1$, $A_2$, $A_3$ (FIG. 8) the failure of this test is recorded as a 1 in an appropriaTE location in the binary failure table for this kinescope.

Figure 9:
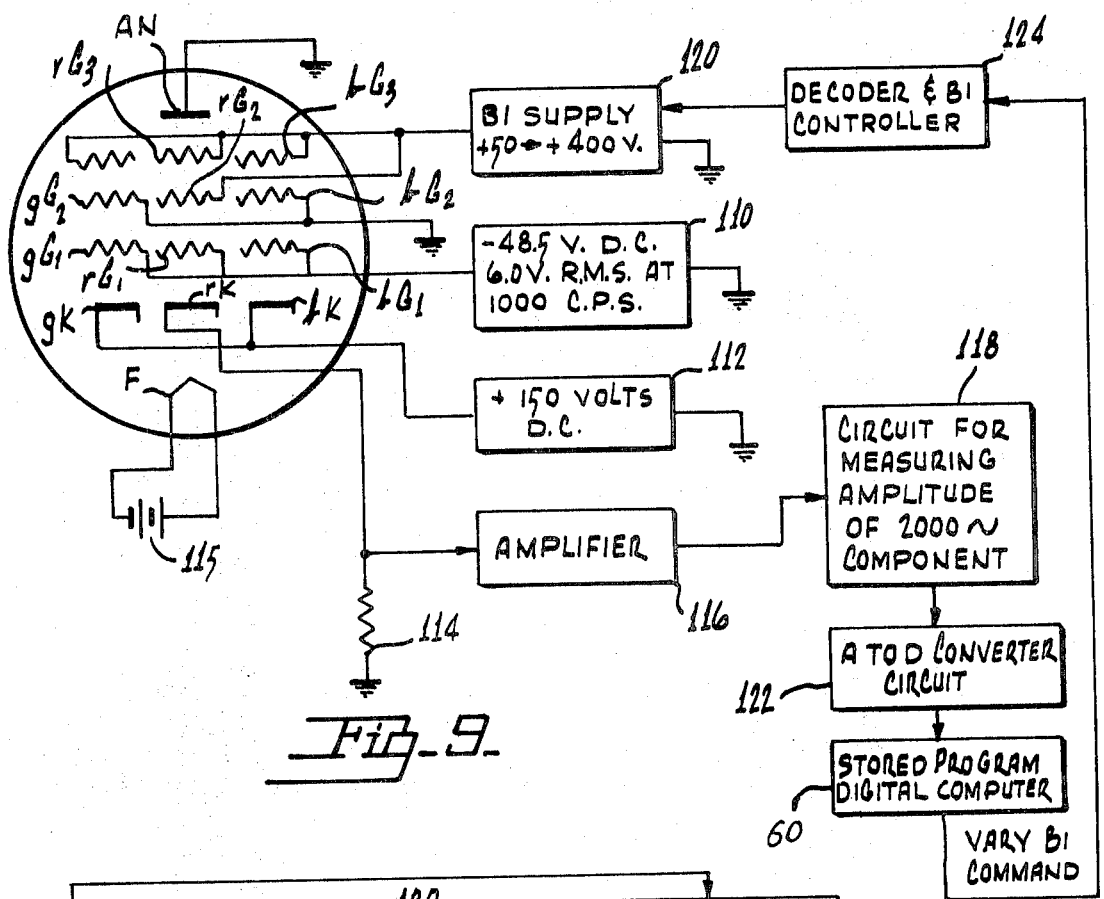
FIG. 9 is a block and schematic diagram showing another type of test performed by the system of the invention.

FIG. 9 illustrates the cutoff voltage test performed in station 66. This test is chosen by way of example because it illustrates an important feature of the invention, namely the ability of the system automatically to vary an applied stimulus—in this case an applied voltage, to obtain an output signal of predetermined value from the kinescope.

The circuit of FIG. 9 is similar to the circuit of FIG. 4 in the sense that many routing relays are present which in response to computer commands are placed in condition such that the power supply voltages shown reach the desired kinescope electrodes. As the operating principles are similar to those already discussed in detail, in the interest of simplifying the drawing the relay contacts are not shown. The $B_1$ supply which may be varied to provide output voltages between +50 and +400 volts DC is connected to the three $G_3$ grids and to the $rG_2$ grid. This supply voltage initially is set at a predetermined value such as +200 volts. The grids $gG_2$ and $bG_2$ are connected to ground. The three $G_1$ grids are connected to power supply 110. This power supply produces a voltage of −48.5 volts DC upon which is superimposed a 6 volt RMS, 1,000 cycles alternating voltage. source 112 applies +150 volts DC to the cathodes $gK$ and $bK$. The cathode $rK$ is connected through a resistor 114 to ground. A direct current source shown as battery 115 supplies 5.5 volts DC to the filament F.

A filter within the amplifier 116 isolates the second harmonic of the 1000-cycle voltage which develops across the cathode resistor 114. This 2000-cycle component is amplified and converted to a direct current whose amplitude is measured by circuit 118.

From previous measurements it is known that in one particular type of kinescope, when the peak value of the 2000-cycle component is at a predetermined level such as 6 to 8 volts, as measured at 118, the kinescope is at cutoff. At that time, the value of the voltage applied by the $B_1$ supply 120 is indicative of the cutoff characteristics of the kinescope.

In actual operation, the preset $B_1$ voltage value of say +200 volts may or may not produce the desired voltage at resistor 114. The direct voltage produced by circuit 118, which is a measure of the 2000-cycle component across resistor 114, is applied to the analog-to-digital converter circuit 122 and the output of the latter is applied to the digital computer 60. In the digital computer, the binary word produced by the analog-to-digital converter is compared with a stored word and if there is an inequality, that is, if the comparison indicates that the 2000-cycle component across resistor 114 did not produce 6- —8 volts, DC the computer generates a vary $B_1$ command. The latter is applied via the decoder and controller 124 to the $B_1$ power supply 120. These circuits are in themselves known. For example, the controller may be a group of relays which select a desired output from the $B_1$ supply and applies it to the $G_3$ grids and the $rG_2$ grid.

The vary $B_1$ command is based on a stored program subroutine calling for variation of the $B_1$ supply voltage in discrete steps. For example, if the 2000-cycle component is too low, the routine causes the $B_1$ supply voltage to jump from +200 volts to +300 volts—one-half the value between 200 and 400 volts. If the AC voltage across resistor 114 is still too low, the program causes the supply voltage again to jump in a discrete step to 350 volts—one-half the value between 300 and 400 volts. The same thing occurs in the opposite sense if the voltage developed across resistor 114 is too high. In any case, the power supply is caused to vary its output, in discrete steps, each one-half the size of the previous step, and in the proper sense to bring the measured voltage to within the desired range in a minimum amount of time. The digital computer 60 keeps track of the actual voltage which it has commanded the $B_1$ supply to apply and when it determines that the measured voltage is in the desired range, it records the value of the $B_1$ supply voltage. As already mentioned, this recorded value is indicative of the cutoff characteristic of the kinescope.

The same feature as discussed above is employed in a number of other of the tests performed on the kinescope. In each case the procedure involves first applying a stimulus of predetermined amplitude and determining whether the signal produced indicative of the parameter it is desired to measure is within a predetermined range and, if not, then changing the value of the applied stimulus in accordance with a predetermined program until the signal indicative of the parameter is at the value desired.

Figure 10:
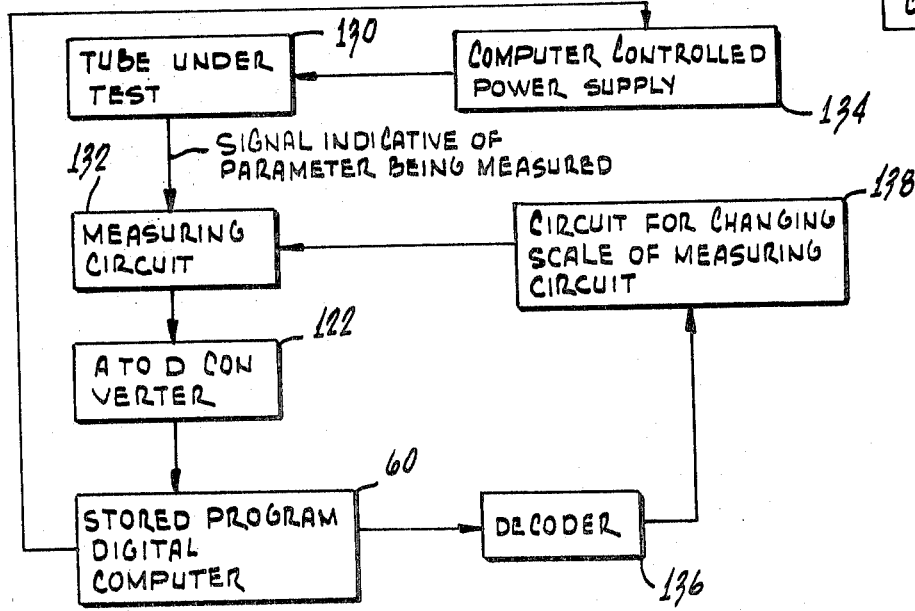
FIG. 10 is a block diagram illustrative of the circuits for automatically changing the scale of the measuring equipment.

FIG. 10 illustrates another feature of the invention. The kinescope under test is illustrated schematically at 130. The measuring circuit is shown at 132, the analog-to-digital converter at 122 and the digital computer at 60. The digital computer 60 commands the computer controlled power supply 134, which may be the power supply of block 58a of FIG. 3, to apply a voltage of predetermined value to the tube under test. The digital computer also sets the scale of the measuring circuit 132 to a predetermined scale. It sometimes occurs that the voltage applied to the kinescope produces an output signal indicative of the parameter being measured which either is too low to be detected by the measuring circuit or is so large that it drives the measuring circuit to saturation. In either case, the digital computer 60 senses this condition and in response thereto applies a binary word to the decoder 136 which commands the decoder to change the scale of the measuring circuit in a sense and amount such that it registers a value greater than a predetermined minimum value and less than one which would cause saturation.

The circuit 138 of FIG. 10 for changing the scale of the measuring circuit may consist of a relay network. If, for purposes of this explanation, the measuring circuit is considered to be an ammeter, the scale changing circuit 138 simply connects one of a number of different values of shunt resistors across the ammeter or, alternatively, removes one or more of the shunt resistors present across the ammeter circuit. In actual practice, the measuring circuit is a network of amplifiers and the same effect is achieved in the amplifiers either by changing the values of the shunt impedances at the input circuit of the amplifier or by adjusting the feedback networks of the amplifiers. The computer 60, of course, keeps track of the scale being employed in the measuring circuit and takes this into account when interpreting the information applied to it by the analog-to-digital converter 122.

As in the case of the circuit of FIG. 9, the circuit of FIG. 10 or circuits analogous thereto are used in many of the tests performed in the system. Also, as in the case of the FIG. 9 circuit, the scales are changed in the system of the invention in real-time, that is, during the time the actual tests are under way at a test station.

FIG. 11 illustrates the tests performed at test station 70 of the system of the present invention (tests performed at test station 68 are quite similar). As in the case of the circuits of FIGS. 9 and 10, the routing relays and the circuits for controlling them, although present, are not explicitly illustrated in FIG. 11.

In the operation of the circuit of FIG. 11, 30,000 volts is applied by source 140 to the anode AN. A voltage of 4600 volts is applied to the three grids $G_3$ by the supply 142. A voltage of 150 volts is applied to the three grids $G_1$ by the supply 14. A voltage of +300 volts is applied to the three cathodes by the supply 146 to insure that the cathodes will not emit. The other three grids $G_2$ are grounded. A voltage of 6.3 volts is applied to the filament by the AC filament supply illustrated schematically at 148.

In response to the voltages above, arcing may occur in the kinescope. If an arc does occur, it is electrostatically sensed by the conductive plate 150 at the test station 70 placed over the faceplate of the kinescope and immediately adjacent to the anode. This element and element 152 are within the housing 63 of FIG. 2.

If an arc is formed between the anode and any other electrode in the kinescope, a pulse is induced in the plate 150 and it passes via line 157 to the counter 156. There may be present within the counter a pulse shaping circuit for amplifying and shaping the pulse and applying it to the counting stages. The counter keeps track of the number of pulses which are produced during a predetermined time interval which, in one particular case, is 8.5 seconds. The information temporarily stored in the counter 156 is applied to the computer during an appropriate interrupt interval occurring at the end of the 8.5 second test period. In the cases in which there are three or more arcs generated during the test period, the computer places a 1 in an appropriate location in the binary failure table for the particular kinescope being tested and the kinescope is rejected.

Under the testing conditions illustrated in FIG. 11, stray emission manifests itself as a glow emanating from the anode. Such a glow, if present, is sensed by the light sensing element 152 and applied to a digitizing circuit 158. This circuit consists of a pulse generator, a gate controlled by a threshold amplifier, and a pulse counter. The gate allows a certain number of pulses, indicative of the level of light sensed, to pass to the counter, where the number is temporarily stored.

During an appropriate interrupt interval, occurring at the end of the 8.5 second test period, the count is applied to the computer. In the case in which the light level is equal to or greater than a level indicated by a count of 5, the computer places a 1 in the appropriate location in the binary failure table of the particular tube being tested and the tube is rejected.

Another feature of the system of the invention is shown in FIG. 12. It is the means by which it is determined that there is a fault in the manufacturing process. For each piece of equipment subject to failure, there is one or more 4-bit tables set aside either in the high speed memory or in some other storage medium of the computer. For example, there is set aside in the main memory for each kinescope carrier at least one such 4-bit table. This one table is illustrated schematically by block 160 of FIG. 12.

If a tube which is supported by a certain carrier during the time it is being aged and tested fails some predetermined test such as emission, the bit 1 is entered into the first storage location in table 160. If the next time that carrier is employed the kinescope it is supporting passes said test, a 0 is entered in the first storage location and the previous bit 1 is shifted forward to the second storage location and so on. The fifth time the particular carrier is employed, the information previously stored in the fourth location is erased; the others are shifted forward; and new information for the fifth tube is entered at the first location.

Under program control, the four bits stored in each storage location are continuously monitored. For purposes of the present explanation, it may be considered that each 4-bit table is connected to a two out of four threshold gate such as shown at 162 (although, in practice, software may be employed to perform the function of circuit 162). It has been found through experience that if two of four successive tubes carried by the carrier fail, then it may be the carrier itself rather than the tubes, which is faulty. Under such circumstances, that is, when two of the storage locations in the table 160 are storing a 1, the threshold gate 160 signals the printer 164 and the latter prints out information to the effect that the particular carrier, identified by number, should be taken out of production until it can be tested and, if necessary, repaired.

Another feature of the invention is shown in FIG. 13. It occurs many different places in the system, however, the circuit shown is illustrative. Block 168 represents a test voltage source. As a general proposition, the actual voltages employed in performing the testing are outside of the range that the analog-to-digital converter can handle. Accordingly, the test voltage source 168 may, in fact, consist of a tap on a potentiometer. A test voltage having a value of say 500 volts may be converted to 10 volts at such a tap for purposes of this test.

The test voltage is applied via routing circuits 170 to the analog-to-digital converter 104. The latter converts the voltage to a binary word which is applied to a storage device 108 which may be a temporary storage circuit such as a register or the like. The comparator 110 compares the stored word with a reference word available at storage means 106. The latter may, in fact, represent a portion of the main memory of the computer and may store a number of different binary words representing different voltages which may be called for by program instructions. The comparator 110 indicates whether the binary word indicative of the test voltage is within a predetermined range. For example, the comparator may indicate whether a test voltage having a nominal value of 5 volts is within the range 4.9 to 5.1 volts. If the binary word indicative of the test voltage is out of the desired range, this information is printed out by the printer 164.

The system of the present invention also has the capability of checking the operation of the analog-to-digital converter 104. To do this, the routing circuits select a voltage produced by the reference voltage source 166 and apply it to the converter. The binary work produced by the converter 104 is then compared with a binary word selected from the storage means 106 to determine whether the converter has correctly translated the analog value of the reference voltage to a binary quantity. If not, the comparator 110 produces an output and the printer 164 prints out a message indicating that the analog-to-digital converter is not operating properly.

In one system in accordance with the invention, the power supply system for the test stations 62, 64 and 66 is checked once every 72 seconds. This system includes the time-shared supply system and the direct current filament supplies. THe amplifiers in the system are also checked once every 72 seconds. The various relays are also periodically checked, however, as the means for doing this is not part of the present invention, it need not be discussed here.

The final feature of the invention it is desired to discuss relates to the statistical analyses automatically prepared by the test system. Each time 100 tubes of a given tube class have been tested, a program is automatically run by the computer which summarizes the results of the tests. It indicates, among other things, the percentage of the tubes which have passed and the reasons for the failures of the tubes which have failed. For certain key tests such as those for gas and emission, it also indicates the average and standard deviations of the data. These analyses are automatically printed out and they enable a skilled observer to detect manufacturing trends. For example, the test may indicate that the flashing of the kinescopes is deteriorating and should be investigated. They may indicate that a vacuum system is not operating at optimum efficiency and should be checked and so on.

It is also possible with the system of the invention to make a complete analysis at the end of each shift or at the end of the operating day to obtain even more refined data concerning the overall manufacturing operation. In addition to indicating equipment deficiencies the data may indicate, in some cases, deficiencies in raw material or in operating personnel.

We claim:

1. A test system for mass produced articles comprising, in combination:
   conveyor means carrying the articles;
   a plurality of test stations located along the conveyor means, each for applying stimuli to the articles and for sensing the signals produced in response thereto;
   stimuli transmission and signal reception means at each test station for coupling to an article for permitting the stimuli to be applied to and the signals received from the article during the time the article is moving;
   digital computer means of the program controlled type connected to control the operation of all of said test stations, at least some in time-shared fashion, that is, during mutually exclusive time intervals, all in accordance with stored program instructions;
   means at at least one of said test stations for measuring the signals sensed in response to the stimuli applied to an article; and
   means responsive to a measurement made by the measuring means which is outside of a predetermined range for changing the value of the applied stimulus, in accordance with stored program instructions in said digital computer means, until said measurement is within said predetermined range.

2. A test system for mass produced articles comprising, in combination:
   conveyor means carrying the articles;
   identification means associated with each article storing data identifying the article and data relating to the steps in the manufacture of the article;
   a plurality of test stations located along the conveyor means, each for applying stimuli to the articles and for sensing the signals produced in response thereto;

stimuli transmission and signal reception means at each test station for coupling to an article for permitting the stimuli to be applied to and the signals received from the article;

digital computer means of the program controlled-type connected to said test stations for controlling their operation, at least some in time-shared fashion, that is during mutually exclusive time intervals, all in accordance with stored program instructions;

means responsive to said identification means of an article for selecting from the programs stored in said computer means, a stored program of instructions for tests to be performed on that article;

means in said digital computer means, responsive to said identification means, for storing said data relating to the steps in the manufacture of each article; and means responsive to the signals sensed at said test stations during the testing of an article and to the information previously recorded relating to the steps in the manufacture of that article, for storing in said digital computer means data concerning possible deficiencies in said steps in the manufacture of said article.

3. A test system for mass produced articles comprising, in combination:

conveyor means carrying the articles;

identification means associated with each article for identifying both the article and the apparatus employed to manufacture that article;

a plurality of test stations located along the conveyor means, each for applying stimuli to the articles and for sensing the signals produced in response thereto;

stimuli transmission and signal reception means at each test station for coupling to an article for permitting the stimuli to be applied to and the signals received from the article;

digital computer means of the program controlled-type connected to said test stations for controlling their operation in accordance with stored program instructions;

means responsive to the information on the identification means of an article for selecting from the program stored in said computer means, a stored program of instructions for tests to be performed on that article;

means responsive to the testing of said article for indicating the disposition to be made of the article if it should fail certain of the tests; and means responsive to the test information regarding an article provided by said test stations and to the information on an identification means concerning the apparatus employed to manufacture the article for indicating which apparatus employed in the manufacture of the article may be faulty.

4. A test system for kinescopes comprising, in combination:

conveyor means carrying the kinescopes;

test station means located along the conveyor means for applying voltages in the normal operating range to electrodes of the kinescopes and for sensing the signals produced in response thereto;

other test station means located along the conveyor means for applying overvoltages to electrodes of the kinescopes for testing for arcing within the kinescope;

voltage transmission and signal reception means at each test station means for coupling to a kinescope for permitting the voltages to be applied to and the signals received from the kinescope;

digital computer means of the program controlled-type connected to all of said test station means for controlling their operation, at least some in time-shared fashion, that is, during mutually exclusive time intervals, in accordance with stored program instructions;

light sensing means at one of said test station means for sensing for light emitted from a kinescope due to stray emission from one of the electrodes of said kinescope in response to a voltage applied to that electrode;

means for translating said light to a count of a value indicative of the intensity of said light; and means for comparing said count with a previously stored count for indicating whether the amount of said stray emission is within acceptable limits.

5. A test system for a kinescope, comprising, in combination:

conveyor means carrying the kinescopes, said conveyor means including carriers for carrying kinescopes along the conveyor means;

test station means located along the conveyor means for applying voltages in the normal operating range to electrodes of the kinescopes and for sensing the signals produced in response thereto;

other test station means located along the conveyor means for applying overvoltages to electrodes of the kinescopes for testing for arcing within the kinescope;

voltage transmission and signal reception means at each test station means for coupling to a kinescope for permitting the voltages to be applied to and the signals received from the kinescope;

digital computer means of the program controlled-type connected to all of said test station means for controlling their operation, at least some in time-shared fashion, that is, during mutually exclusive time intervals, in accordance with stored program instructions; and said digital computer means including means for recording for each carrier the number of kinescopes carried by that carrier which have failed, and means for analyzing the recorded information for each carrier, an excessively large number of kinescope failures for a particular carrier indicating a possible fault in that carrier.

6. A test system as set forth in claim 5, wherein said means for recording comprises, for each carrier, memory means individual to that carrier, wherein said means for recording includes means for entering a binary digit of one value into a memory means each time the kinescope on the carrier assigned to that memory means fails and entering a binary digit of other value into said memory means each time the kinescope on the carrier assigned to that memory means passes, and means for erasing from that memory means, after a given number of bits have been entered, the oldest bit stored each time a new bit is entered.

7. A test system as set forth in claim 6, wherein said means for analyzing includes means for producing an indication when a memory means stores greater than a given number of bits of said one value.

8. A test system for kinescopes comprising, in combination:

conveyor means carrying the kinescopes;

test station means located along the conveyor means for applying voltages in the normal operating range to electrodes of the kinescopes and for sensing the signals produced in response thereto;

other test station means located along the conveyor means for applying overvoltages to electrodes of the kinescopes for testing for arcing within the kinescope;

voltage transmission and signal reception means at each test station means for coupling to a kinescope for permitting the voltages to be applied to and the signals received from the kinescope; and digital computer means of the program controlled-type connected to all of said test station means for controlling their operation, at least some in time-shared fashion, that is, during mutually exclusive time intervals, in accordance with stored program instructions, said digital computer means including a memory having a plurality of subareas, each for a different kinescope, said digital computer means further including means for recording in the respective subareas the number of tests the respective kinescopes have failed, said digital computer means further including means, under program control, for analyzing the data in each subarea to indicate the disposition to be made of each kinescope.

9. A test system for kinescopes comprising, in combination:

conveyor means carrying the kinescopes;

test station means located along the conveyor means for applying voltages in the normal operating range to electrodes of the kinescopes and for sensing the signals produced in response thereto;
other test station means located along the conveyor means for applying overvoltages to electrodes of the kinescopes for testing for arcing within the kinescope;
voltage transmission and signal reception means at each test station means for coupling to a kinescope for permitting the voltages to be applied to and the signals received from the kinescope; and
digital computer means of the program controlled-type connected to all of said test station means for controlling their operation, at least some in time-shared fashion, that is, during mutually exclusive time intervals, in accordance with stored program instructions, said digital computer means including a memory and subareas in the memory for respective steps in the precess of manufacturing said kinescopes, said digital computer means also including means responsive to an indication that a kinescope has failed a test for placing in the subarea of the memory assigned to the manufacturing step pertinent to that failure a record of said failure, and said digital computer means also including means for analyzing the respective subareas for indicating a possibly faulty step in the process of manufacturing the kinescopes.

UNITED STATES PATENT OFFICE
CERTIFICATE OF CORRECTION

Patent No. 3,576,494           Dated April 27, 1971

Inventor(s) Walter E. Bahls et al

It is certified that error appears in the above-identified patent and that said Letters Patent are hereby corrected as shown below:

Page 1, line 8, change "Filed July 23, 1967" to
--Filed July 13, 1967--

Signed and sealed this 7th day of September 1971.

(SEAL)
Attest:

EDWARD M. FLETCHER, JR.         ROBERT GOTTSCHALK
Attesting Officer                Acting Commissioner of Paten